United States Patent [19]

Kawamura

[11] Patent Number: 5,214,333
[45] Date of Patent: May 25, 1993

[54] ENGINE WITH FLYWHEEL GENERATOR

[75] Inventor: Hideo Kawamura, Samukawa, Japan

[73] Assignee: Isuzu Ceramics Research Institute Co., Kanagawa, Japan

[21] Appl. No.: 626,034

[22] Filed: Dec. 12, 1990

[30] Foreign Application Priority Data

Dec. 12, 1989 [JP] Japan .................................. 1-322426

[51] Int. Cl.⁵ ............................................. H02K 21/22
[52] U.S. Cl. ....................................... 310/153; 60/608
[58] Field of Search ................. 310/153, 152, 74, 112,
310/254; 60/607, 597, 608, 605.1

[56] References Cited

U.S. PATENT DOCUMENTS

| | | | |
|---|---|---|---|
| 2,769,302 | 11/1956 | Purdie et al. | 60/607 |
| 2,803,942 | 8/1957 | Johansson et al. | 60/608 |
| 3,355,879 | 12/1967 | Smith et al. | 60/608 |
| 3,629,632 | 12/1971 | Loupe | 310/153 |
| 4,745,754 | 5/1988 | Kawamura | 60/608 |
| 4,935,656 | 6/1990 | Kawamura | 60/608 X |
| 4,958,497 | 9/1990 | Kawamura | 60/608 |
| 5,036,669 | 8/1991 | Earleson et al. | 60/602 |

Primary Examiner—Steven L. Stephan
Assistant Examiner—Ed To
Attorney, Agent, or Firm—Staas & Halsey

[57] ABSTRACT

An engine has a flywheel which has a high peripheral speed even when the engine rotates at a low speed. The flywheel has a plurality of permanent magnets mounted on an outer circumference thereof and having alternately different magnetic poles. A stator is disposed in confronting relation to radially outer ends of the permanent magnets. Electric energy induced by the stator upon rotation of the flywheel is supplied to a rotary electric machine combined with a turbocharger to assist the turbocharger in supplying air under pressure to the engine when the engine rotates at low speed.

8 Claims, 2 Drawing Sheets

ENGINE WITH FLYWHEEL GENERATOR

BACKGROUND OF THE INVENTION

1. Field of the Invention:

The present invention relates to an engine with a flywheel generator comprising permanent magnets mounted on the outer circumference of a flywheel and a stator confronting the permanent magnets, for generating electric energy to assist a turbocharger in increasing a boost pressure when the engine rotates at low speed.

2. Description of the Prior Art:

Conventional engines, particularly two-cycle engines, are required to be supercharged. Since the exhaust and intake strokes of a two-cycle engine are effected at the same time, the exhaust gases are forced out of a cylinder by intake air introduced into the cylinder, and therefore the intake air has to be forced into the cylinder.

Various devices have been proposed to supply intake air under pressure into the cylinder. One of the proposed devices is a turbocharger having an exhaust turbine rotatable by the energy of exhaust gases, and a compressor rotatable by the exhaust turbine to force air under pressure into the cylinder.

As the two-cycle engine has a power stroke each time the crankshaft makes one revolution, the amount of discharged exhaust gases is larger than that of the four-cycle engine. Thus, the two-cycle engine is suitable for driving a turbocharger.

However, even the two-cycle engine discharges a small amount of exhaust energy when it rotates at low speed, and air cannot effectively be forced into the cylinder with such a small amount of exhaust energy.

To overcome the above drawback, there has been proposed a turbocharger with a rotary electric machine connected to the rotatable shaft of the turbocharger. When the rotational speed of the engine is low, the rotary electric machine is supplied with electric energy to operate as a motor which assists the turbocharger to increase the boost pressure. However if the electric energy is supplied from a battery to the rotary electric machine, then the battery must be large in size, weight, and volume.

According to another proposal, a recovery turbine is disposed downstream of the exhaust turbine, and actuates a generator to generate electric energy. When the engine rotates at low speed, however, the above problem cannot be solved since the energy of available exhaust gases is small.

SUMMARY OF THE INVENTION

According to the present invention, there is provided an engine system with an engine, including a flywheel having a plurality of permanent magnets mounted on an outer circumference thereof and having alternately different magnetic poles. Stator is disposed in confronting relation to radially outer ends of the permanent magnets, for including electric energy in response to rotation of the flywheel. A turbocharger is provided for supplying air under pressure to the engine. The turbocharger has a rotatable shaft and a rotary electric machine disposed on the rotatable shaft. Means are provided for supplying electric energy generated by the stator to the rotary electric machine to assist the turbocharger in supplying air under pressure, when the rotational speed of the engine is lower than a predetermined speed. Even when the engine rotates at low speed, the stator effectively generates electric energy, which is supplied to the rotary electric machine.

The above and other objects, features and advantages of the present invention will become more apparent from the following description when taken in conjunction with the accompanying drawings in which a preferred embodiment of the present invention is shown by way of illustrative example.

DETAILED DESCRIPTION OF THE PREFERRED EMBODIMENT

Figure 1:
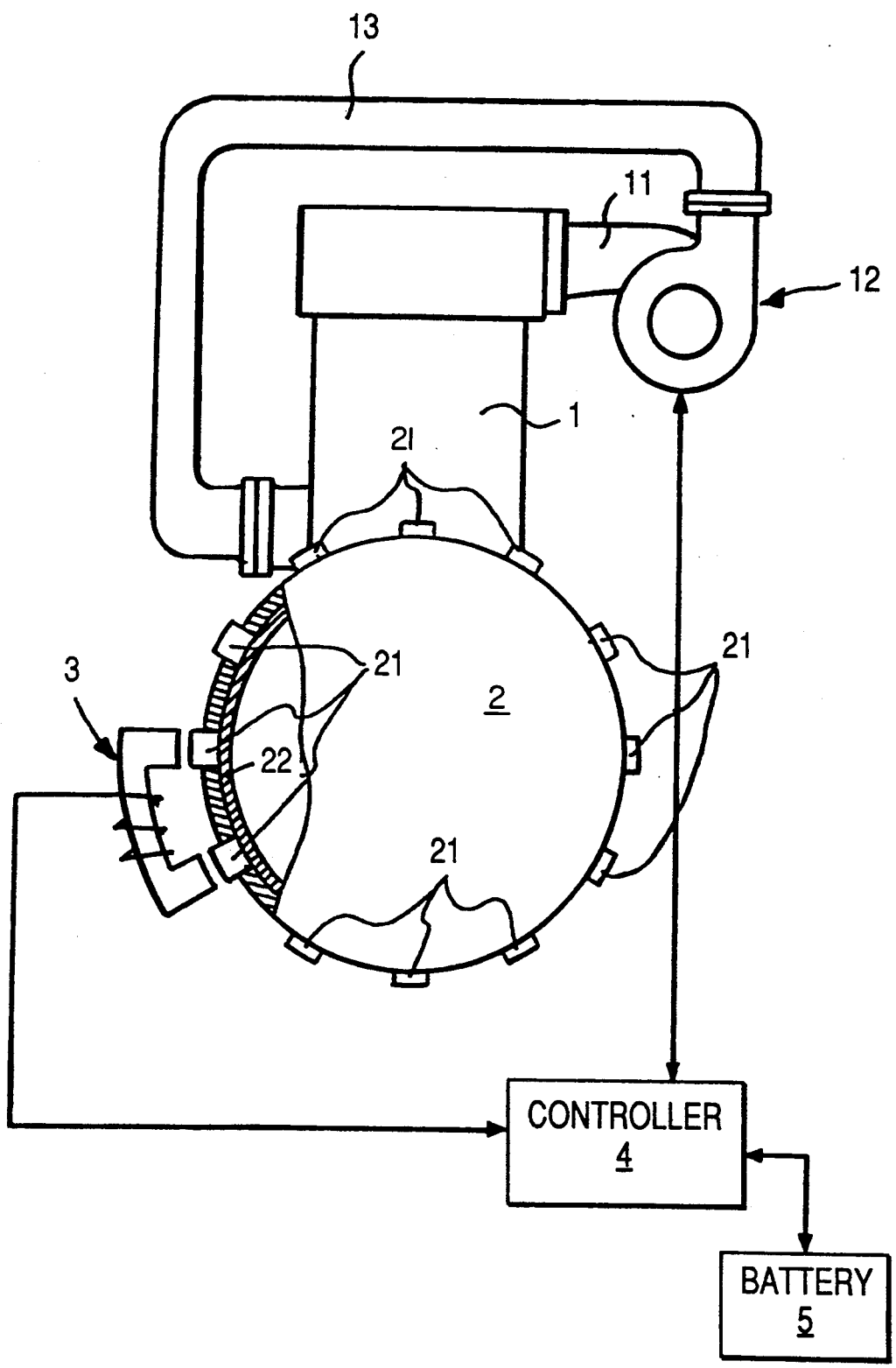
FIG. 1 is a front elevational view, partly broken away and in block form, of an engine with a flywheel generator according to the present invention.

FIG. 1 shows a two-cycle engine 1 which repeats its cycle strokes each time a crankshaft makes one revolution. The engine 1 has an exhaust pipe 11 extending and joined to an exhaust turbine casing of a turbocharger 12 with a rotary electric machine 123.

The turbocharger 12 comprises an exhaust turbine and a compressor which are held coaxially with each other. The rotary electric machine 123 has a flywheel 2 and a stator 3, and is disposed on the rotatable shaft 15 of the turbocharger 12 which interconnects the exhaust turbine and the compressor. The rotary electric machine 123 operates as a motor when supplied with electric energy from an external source. The compressor communicates with an intake pipe 13, which supplies compressed air from the compressor into a cylinder of the two-cycle engine 1.

Figure 2:
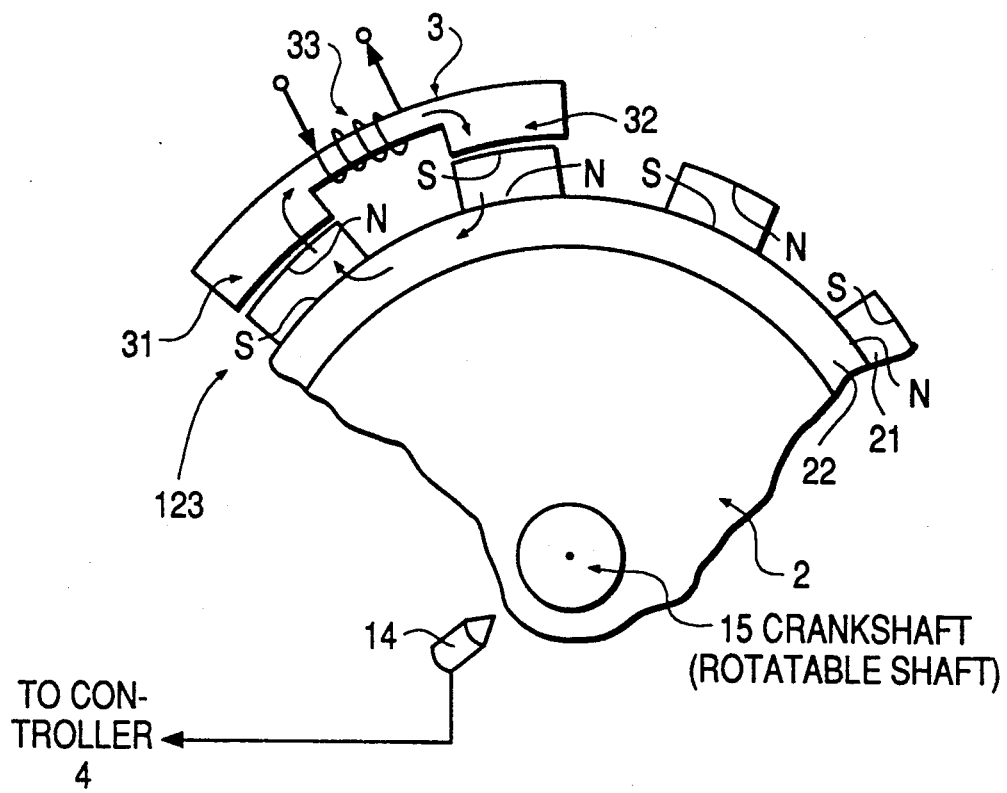
FIGS. 2 and 3 are enlarged, partial, front-elevational views of the flywheel generator of the present invention.
Figure 3:
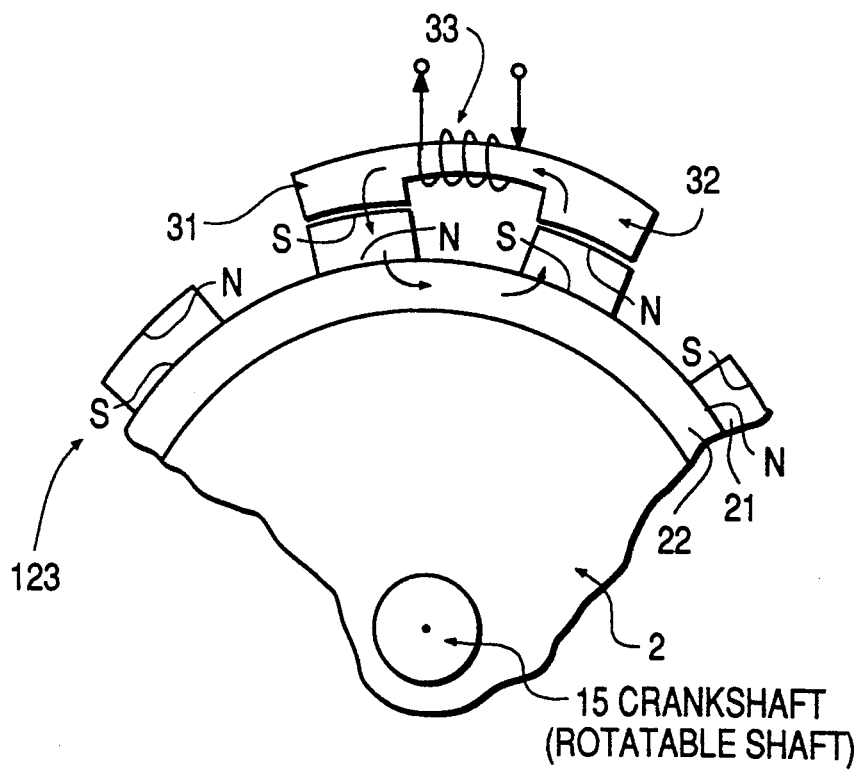

To the rotatable shaft of the engine 1, there is coupled the flywheel 2 having a plurality of permanent, magnets 21 disposed on the outer circumference thereof. As shown in FIG. 2 and FIG. 3, the permanent magnets 21 have magnetic poles on their radially outer sides, the magnetic poles having alternately different polarities. The radially inner ends of the permanent magnets 21 are held against a magnetic path ring 22 of magnetic material.

The stator 3 is disposed adjacent to the outer circumference of the flywheel 2. The stator 3 comprises a pair of magnetic poles 31 and 32 confronting the outer magnetic poles of two of the permanent magnets 21, and a coil 33 wound around a core by which the magnetic poles of the stator 3 are interconnected.

The coil of the stator 3 and the rotary electric machine are electrically connected to a controller 4 to which a battery 5 is also coupled.

The controller 4 controls the flow of electric energy. More specifically, when a rotation sensor 14 detects that the engine 1 rotates at low speed, electric energy from the stator 3 and the battery 5 is supplied to the rotary electric machine by the controller 4. When the rotation sensor 14 detects that engine 1 rotates at high speed, electric power generated by the rotary electric machine 123 is supplied to the battery 5 by the controller 4.

Operation of the engine 1 will be described below.

When the engine rotates at low speed, exhaust gases flow at a low rate from the exhaust pipe 11 to the turbocharger 12, and hence the boost pressure of intake air supplied to the intake pipe 13 does not increase. The controller 4 converts DC electric energy from the battery 5 and the stator 3 into AC electric energy of a predetermined frequency, and supplies the AC electric energy to the rotary electric machine 123 of the turbocharger 12. The rotary electric machine 123 then operates as a motor, i.e., rotates at a rotational speed corresponding to the frequency of the supplied AC electric energy, thus assisting the compressor in compressing air.

The flywheel 2 has a relatively large diameter. If the diameter of the flywheel 2 is 400 mm, then when it rotates at a speed of 1,000 rpm, the electric energy produced by the stator 3 corresponds to the electric energy which would be generated by a generator having a core of a diameter of 40 mm and rotating at 10,000 rpm.

As the rotational speed of the engine 1 rises and the energy of exhaust gases from the exhaust pipe 11 increases to a level sufficiently high to drive the turbocharger 12, the controller 4 stops supplying the electric energy to the rotary electric machine. At this time, the electric energy generated by the stator 3 may be stored in the battery 5, or the stator 3 may be arranged to apply no load to the flywheel 2, thus reducing braking forces imposed on the flywheel 2.

When the rotational speed of the engine 1 increases further to the point where the energy of exhaust gases exceeds the amount of energy required by the supercharging process, the controller 4 connects a load to the rotary electric machine to operate the same as a generator. Therefore, the excess exhaust energy is converted into electric energy, which is used to charge the battery 5.

Although a certain preferred embodiment has been shown and described, it should be understood that many changes and modifications may be made therein without departing from the scope of the appended claims.

I claim:

1. An engine system comprising:
   an internal combustion engine, said engine including a crankshaft and a flywheel fixed to said crankshaft for rotation therewith, said flywheel including a peripheral ring of magnetic material, there being a plurality of permanent magnets mounted on an outer circumference of said ring and having alternately different magnetic poles;
   a stator disposed in confronting relation to radially outer ends of the permanent magnets, for inducing electric energy in response to rotation of the said flywheel;
   a turbocharger for supplying air under pressure to the engine, said turbocharger having a rotatable shaft;
   a rotary electric machine disposed on said rotatable shaft; and
   means for supplying electric energy generated by said stator to said rotary electric machine to assist the turbocharger in supplying said air under pressure to the engine when the rotational speed of the of the engine is lower than a predetermined speed.

2. An engine system according to claim 1, wherein said engine comprises a two-cycle engine.

3. An engine turbocharging system for an internal combustion engine having a crankshaft and a flywheel fixed to the crankshaft for rotation therewith, said system comprising:
   a turbocharger having a rotary electric machine;
   generating means including a peripheral ring of magnetic material on said flywheel and a series of permanent magnets having alternately different magnetic poles on said ring for generating electric energy from rotation of the flywheel; and
   control means for controlling flow of electric energy from said generating means to supply power to the rotary electric machine to drive said turbocharger when the engine operates below a predetermined speed.

4. An engine turbocharging system according to claim 3, further comprising a battery, wherein said control means supplies power from said generating means to said battery when the engine operates above the predetermined speed.

5. An engine turbocharging system according to claim 3, wherein said control means comprises a rotation sensor provided in the engine to detect a rotation speed of said crankshaft.

6. An engine turbocharging system according to claim 4, wherein said control means comprises a rotation sensor provided in the engine to detect a rotation speed of said crankshaft.

7. An engine turbocharging system according to claim 3, wherein said generating means comprises a stator having magnetic poles confronting said magnets.

8. An engine turbocharging system according to claim 4, wherein said generating means comprises a stator having magnetic poles confronting said magnets.

* * * * *

UNITED STATES PATENT AND TRADEMARK OFFICE
CERTIFICATE OF CORRECTION

PATENT NO. : 5,214,333
DATED : May 25, 1993
INVENTOR(S) : HIDEO KAWAMURA

It is certified that error appears in the above-identified patent and that said Letters Patent is hereby corrected as shown below:

On the title page:

Item: [73] Assignee, line 2, after "Co.," insert --Ltd.,--.

Column 1, line 58, "Stator" should be --A stator--;

line 60, "including" should be --inducing--;

line 64, before "disposed" insert --is--.

Column 2, line 56, after "4" insert --, for example, a processor such as a CPU,--.

Signed and Sealed this

Twenty-second Day of February, 1994

Attest:

BRUCE LEHMAN

*Attesting Officer*  *Commissioner of Patents and Trademarks*